Jan. 7, 1941.  A. SCHMALENBACH  2,228,128
GAS AND LIQUID CONTACT APPARATUS
Filed July 21, 1938   2 Sheets-Sheet 1

Inventor:
Adolf Schmalenbach.
By Henry Love Clarke
his Attorney.

Jan. 7, 1941. A. SCHMALENBACH 2,228,128
GAS AND LIQUID CONTACT APPARATUS
Filed July 21, 1938 2 Sheets-Sheet 2

Inventor:
Adolf Schmalenbach,
By Henry Love Clarke,
his attorney.

Patented Jan. 7, 1941

2,228,128

UNITED STATES PATENT OFFICE 2,228,128

GAS AND LIQUID CONTACT APPARATUS

Adolf Schmalenbach, Essen, Germany, assignor, by mesne assignments, to Koppers Company, Pittsburgh, Pa., a corporation of Delaware Application July 21, 1938, Serial No. 220,586
In Germany July 22, 1937

2 Claims. (Cl. 261—22)

The present invention relates to contrivances for bringing gaseous media into contact with liquids, for instance for the washing of coal distillation gases with wash oil in order to recover valuable constituents of the gas, and more particularly to washing contrivances which comprise an essentially cylindrical casing subdivided by radial transverse walls into several compartments in annular series which are traversed by the liquid and the gas in any desired manner. The expression "washing contrivances" when used in this specification generally means contrivances for bringing gases into contact with liquids in the broadest sense of the word, i. e. as well contrivances for washing out certain constituents from gases, as well as contrivances for treating a liquid with a gas or gas mixture in order to produce any desirable reactions in the liquid.

Washing contrivances of the above mentioned type offer the advantage that they require a rather small ground space and the manufacture of such washers is inexpensive. The disadvantage of the washers known hitherto which are fitted with a cylindrical casing subdivided by radial transverse walls consists in that the cross section of the individual compartments of the washer greatly differs from the circular or honeycomb shape, which form is the most favourable for the uniform distribution of the liquid and of the gas.

The principal object of my present invention is to provide such improvements for the above mentioned washing contrivances with cylindrical casing and with several washing compartments formed therein by radial transverse walls that the cross section of the individual compartments will practically be of honeycomb shape so as to obtain a good distribution of the washing liquid and of the gas to be treated over the whole cross area of the individual washer compartment, thus ensuring a high efficiency of the washer.

Now, the leading feature of the present invention is that the radial transverse walls between the individual compartments of the washer comprising an essentially cylindrical casing are divided or forked towards the cylindrical outer shell of the casing in such a manner that at the outer shell of the casing there are formed vertical channels of an approximately triangular cross-section which serve for the circulation of the gas from one washer compartment into the adjoining or to another place of the washer.

In the middle of the washer casing, I preferably arrange an inner cylindrical or polygonal compartment coaxial with the cylindrical outer shell of the casing. The radial transverse walls of the washer with the forked walls extend from said inner circular or polygonal compartment.

The present invention, therefore, offers the advantage that the dead corners in the individual sector-like compartments of the hitherto-known washers with cylindrical casing and radial transverse walls fitted therein will be omitted. According to the invention it is possible to make the cross section of the individual compartments practically of hexagonal shape or honeycomb-shape by a suitable dimensioning of the forked portions of the transverse walls and possibly also the inner cylindrical compartment of the casing so that a very effective and uniform distribution of the gas and of the liquid is arrived at.

Further objects of the invention ensure a higher enrichment of the washing liquid with the constituents taken up from the gas than formerly, as set forth in the following.

With the hitherto-known washing contrivances consisting of individual washing towers, the delivery of the washing liquid to the individual washers was generally made in counter-current to the direction of the gas stream so that the gas to be purified flows through the individual washers one after the other, while the washing liquid takes the opposite path.

When adopting this known operating method, it is necessary to deliver the last washer of the group always with such a quantity of fresh liquid as is necessary for bringing it into contact with the gas to be purified in an equal way, although a considerably smaller quantity of freshly added liquid would suffice for a complete purification of gas in the final washer. The regeneration of this unnecessarily large quantity of washing liquid in turn requires a correspondingly large apparatus and increases the steam consumption and the operating cost of the plant.

To this end, a further object of the present invention consists in the provision of means whereby only such a quantity of washing liquid need be delivered to the series of washer compartments as is necessary for the complete purification of the gas. This idea of the invention may be advantageously practiced in connection with the washing contrivances of the new type according to the invention, as described in the following description.

According to the invention, I arrange in the radial partition walls of the washer casing, near the bottom of same, suitable connecting openings which permit the liquid to flow from one washer compartment into the next adjacent one, and I make such openings of such a cross-area that the quantity of liquid which flows through said openings into the next compartment will be equal to the quantity of liquid freshly added to the washer series. Furthermore I arrange the connection of the circulation pipe, which leads the liquid which collects upon the bottom of the compartment to the top of same, as near as possible to the opening provided therefor in the radial partition wall. In this way the liquid which flows through the said opening in the radial partition wall is prevented from flowing immediately through the adjacent compartment to the next succeeding one. The liquid is forced, however, beforehand into the said connecting pipe and circulated in this way through the washer compartment together with a certain quantity of spent liquid collecting on the bottom of the washer compartment.

Furthermore the sector-like compartments formed by the radial partition walls are arranged in groups according to the invention so that alternatively only the individual groups or all compartments may be used for washing. This is advantageous in so far as it is now possible to disconnect certain washer compartments or groups of same, for instance in order to clean out the apparatus or to adapt the apparatus to a smaller capacity.

According to the invention, this problem is favourably solved in such a way that a by-pass fitted with a shut-off means is provided at the gas exit of a group of washer compartments so that the gas may be discharged from the by-pass or led through same into the next compartments.

With the above and other objects and features of my present invention in view, I will now describe a preferred embodiment of my invention on the lines of the accompanying drawings, in which.

Figure 1:
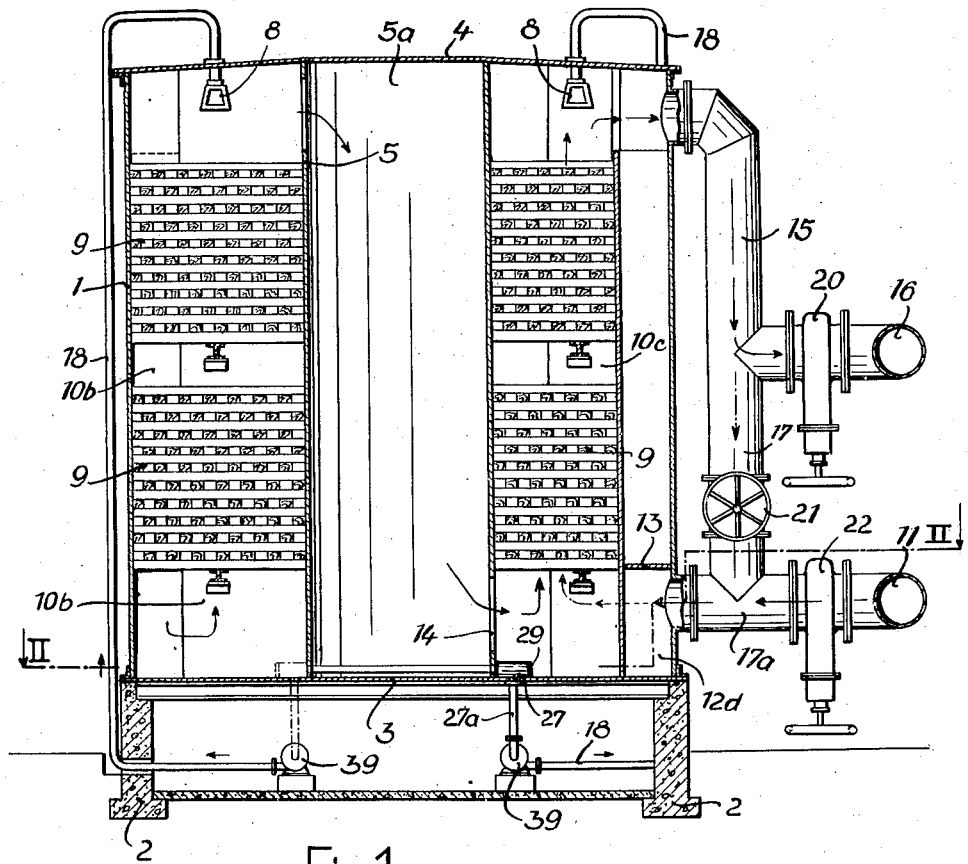
Fig. 1 shows a vertical section through a washing contrivance on line 1—1 of Fig. 2.

The washer illustrated on the drawings comprises a substantially cylindrical casing 1 built on a foundation 2. The casing is closed below by the bottom 3 and at the top by the cover 4. Co-axial with the casing wall 1, there is a central smaller casing 5 which likewise is of a substantially cylindrical shape and connected with the bottom 3 and the cover 4 in a gas tight manner.

From the wall 5 there extend to the outer wall, radial partition walls 6 each of which fork against the casing wall 1 into two walls 6a, 6b forming the vertical and gas tight channels 12 together with the casing wall 1.

The washing liquid is delivered to the separate washing compartments 10 which are fitted with hurdles 9 or other suitable filling bodies, through the sprays 8 provided in the cover 4. The washing liquid distributes over the hurdles 9 and flows downwards and finally collects upon the bottom of each compartment 10. The gas from the washer compartments 10 is preferably led from below, thus coming into intimate contact in counter-current with the washing liquid.

In the upper part, the gas flows from the washer compartments 10 into one of the adjacent vertical channels 12, passes downwards therein and then enters another washer compartment 10. In this way it is possible for the gas to flow through all the compartments 10 of the washing contrivance one after the other.

It is advisable to provide a separate liquid circulation system for each washing compartment 10. The washing liquid accumulating on the bottom of the compartment is pumped through a suitable pipe line to the spray 8 or any other suitable distributing device provided therefor at region of the cover of each compartment.

Figure 2:
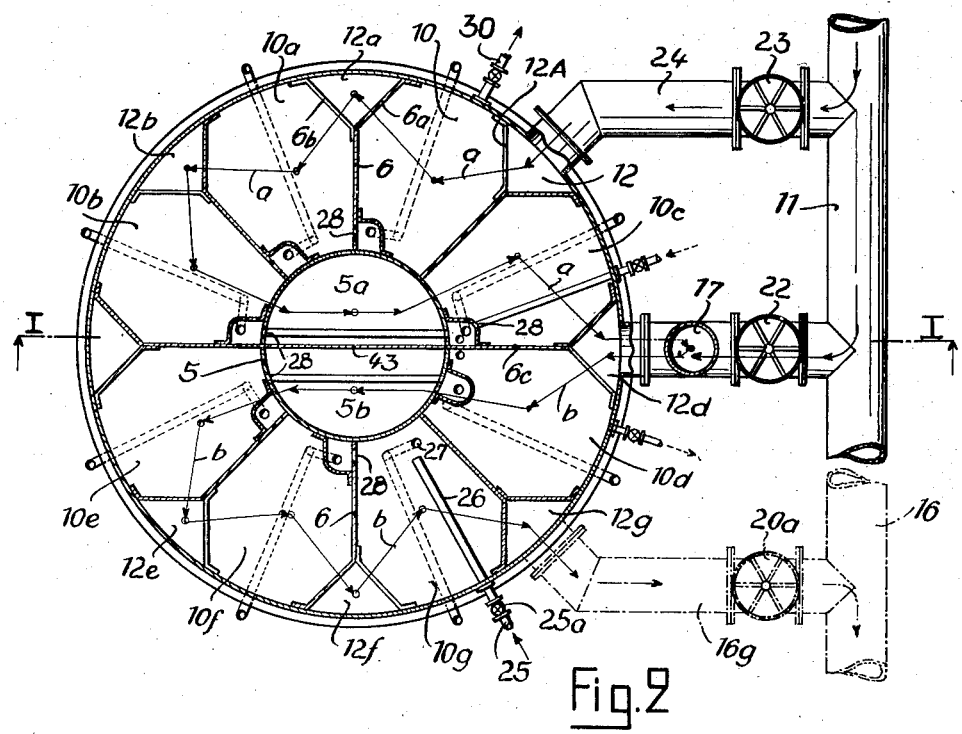
Fig. 2 shows a horizontal section through a washing contrivance on line 2—2 of Fig. 1.

The paths taken by the gas and the liquid through the washing contrivance are more fully explained in the following:

As shown in Fig. 2, the gas may flow through two groups of washer compartments. In this case the gas first flows from the main pipe line 11 (Fig. 2) into the bottom of the triangular vertical channel 12 in which is arranged a horizontal partition wall 13 (Fig. 1) preventing the gas from flowing upwards. The channel 12 is connected below with the compartment 10 through the opening 12A. The gas enters this compartment 10 (see arrows $a$ in Drawing 2) and flows upwards. After flowing through the hurdles 9 or other suitable distributing means, the gas enters the next triangular channel 12a through which it passes downwards to the next washer compartment 10a. From there, the gas passes through the channel 12b into the washer compartment 10b. The gas from the washer compartment 10b is delivered through an upper connecting opening into the central cylindrical compartment 5a which is separated from the compartment 5b through the vertical partition wall 43. The compartments 5b and 5a are situated within the central cylindrical casing part 5.

The gas in the compartment 5a flows downwards and then passes through a lower connecting opening 14 (Fig. 1) into the washer compartment 10c which lies near the channel 12 through which the gas flows in at first. From that compartment 10c the gas is sucked-off above into the pipe 15 formed as a by-pass. The by-pass 15 is connected with a main discharge pipe 16 controlled by a shut-off valve 20, and similarly as to pipe 17 which is controlled by the shut-off valves 21, 22. Between the shut-off valves 20, 21 is situated the connecting pipe line 17a leading to the bottom of the channel 12d.

Instead of withdrawing the gas from the pipe line 15 into the pipe line 16, it may also be led after a suitable reversal of the valves 20, 21, 22 from the by-pass 15 through the connecting pipe 17, as indicated by the arrows $b$ (Fig. 2) into the washer compartments 10d, thence into the central compartment 5b, through the washer compartment 10e, channel 12e, compartment 10f, channel 12f, compartment 10g into the channel 12g, pipe line 16g to the main collecting pipe 16.

If only one half of the washing contrivance is to be used, for instance for the purpose of cleaning the other half, the gas introduced into the by-pass 15 may be delivered through the opened valve 20 immediately into the discharge pipe line 16. In this event the valves 21, 20a are shut off.

As soon as the cleaning work in one half of the washing contrivance is finished, this half may be put into operation and the other half may be shut-down. The contrivance may be operated in such a way that the valve 22 of the connecting pipe line 17a is opened and the gas from the main delivery pipe 11 is led into the washer compartments 10d, the central compartment 5b, the washer compartment 10e, 10f and 10g and finally to the main collecting pipe 16. The second half of the washing contrivance is then separated from the main pipe line 11 by means of the shut-off valve 23 provided for in the connecting line 24.

Figure 4:
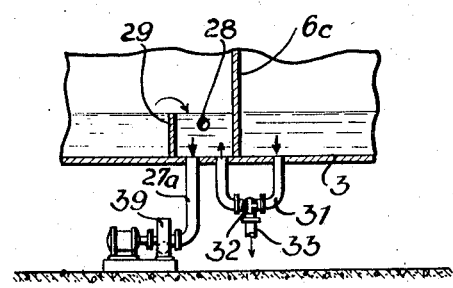

It is advisable that the washing liquid flows in the opposite direction through the washer compartments as compared with the gas path. The washing liquid flows to the compartment 10g through the pipe 25 controlled by a valve 25a. The pipe 25 is connected with a pipe line 26 which slightly projects above the bottom of the washer into the washer compartment 10g up to near the liquid outlet 27. The liquid is forced through the pipe line 27a by means of the pump 39 through the pipe 18 to the spray 8 which is arranged at the top of the washer compartment. In the radial walls 6 separating the washer compartments there is arranged near the bottom approximately in line with the end of the liquid inlet pipe 26 an overflow opening 28 through which flows a part of the washing liquid collecting upon the bottom of the washer compartment into the next compartment. The liquid flowing through such an overflow 28 first enters a small overflow pot 29 (Fig. 4) which reaches up to cover the overflow opening and which is opened above. To the bottom of the overflow pot 29 is connected the suction main of the liquid circulation system belonging to the washer compartment.

The liquid is, therefore, introduced into each washer compartment near the exit of the circulating pipe, thus ensuring that the liquid flowing over from one compartment to the next is caught directly by the pump and together with a part of the liquid already accumulating on the bottom of the washer compartment it is circulated to the top of the washer. This procedure is repeated in a suitable manner for all washer compartments.

As may be seen from the drawings, the washing liquid enriched or spent, flows from every washer compartment at a point which lies opposite the entrance of the washing liquid into the compartment. The liquid inlet is furthermore situated within a sort of seal which is arranged on the bottom of the washer compartment and consequently, the liquid entering the compartment cannot mingle with the spent liquid running downwards through the hurdles and collecting on the bottom of the compartment so that the inflowing liquid does not flow across the bottom into the next compartment thereafter. The freshly admitted liquid is, instead, first recirculated in every washer compartment before entering a next compartment, thus effecting a high efficiency of the washer.

In this way only so much fresh washing liquid is added through the pipe 25 as necessary for the complete extraction of the gas. The washing liquid thus absorbs the largest possible quantity of constituents to be extracted from the gases. After the washing liquid has passed through all the washer compartments one after the other, it leaves the washer compartment 10 through the pipe line 30.

In order to be able to shut off the washing liquid in a suitable manner, if only one half of the washing contrivance is to be used, the transition of the washing liquid around the partition wall 6c (Figs. 2 and 3) separating the two washer groups from one another takes place by a syphon-like pipe 31 (Fig. 4) which is connected with the discharge pipe 33 by means of a three-way cock 32. By a reversal of the three-way cock 32 the stream of liquid through the one or other washer group may be stopped which depends upon the group to be kept in operation and the washing liquid is only allowed to circulate through one group.

Figure 3:
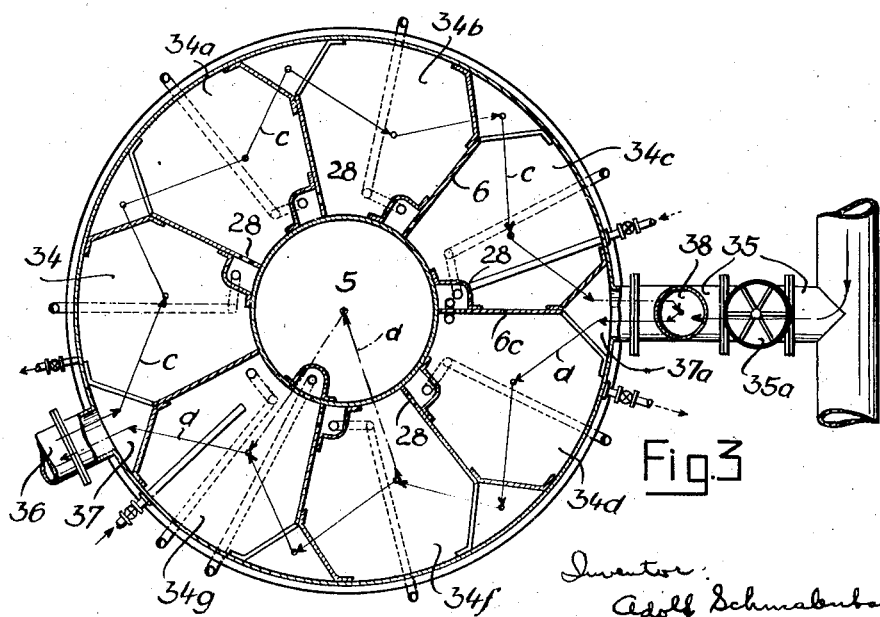
Fig. 3 shows another form of construction according to the invention likewise in horizontal section and Fig. 4 finally shows on an enlarged scale a vertical section of a part of the washer.

With the washing contrivance illustrated in Figs. 1 and 2, the central compartments 5a, 5b do not serve for the treatment of the gas. Fig. 3 shows a construction in which the central compartment 5 is also filled with hurdles and which serves for the purification of the gas. The gas may then flow through the various washer compartments as follows:

The gas from the main gas pipe flows through the connecting piece 36 to the bottom of the vertical triangular channel 37, the top of which is closed. Thence the gas flows in series to the compartments 34, 34a, 34b into the washer compartment 34c as shown by arrows C in Fig. 3.

From the washer 34c, the gas enters the vertical channel 37a above and from here it may be withdrawn through the pipe line 35 governed by the valve 35a or as already illustrated in Figs. 2—1 similarly through the vertical pipe 38 downwards into the lower half of the triangular casing compartment 37a and from here further on through the washer compartments 34d, 34f, the central compartment 5 and the last compartment 34g. Thence the gas enters the upper half of the triangular compartment 37 to which the gas outlet pipe is connected (see arrows d in Fig. 3).

In this way the greatest variety in the flow of gases and also of the washing liquid is rendered possible. Instead of operating two washer groups according to the method described in the foregoing it is also possible to use several groups separately in a similar manner when the removal of the various constituents from the gas may also be effected by means of different liquids in the groups of compartments which can be used independently from one another.

I have now above described the present invention on the lines of a preferred embodiment thereof, but my invention is not limited in all its aspects to the mode of carrying it out as described and shown, since the invention may be variously embodied within the scope of the following claims.

I claim:

1. Gas and liquid contact apparatus comprising: a substantially annular casing closed at bottom and top; radial partition walls arranged in the casing between the inner and outer walls of the casing and connected therewith and with the bottom and top in a gas tight manner to form an annular series of gas treating compartments; means for introducing liquid to the respective compartments at their upper parts; means for withdrawing the liquid from the compartments at their lower parts; said radial partition walls being terminated in forked walls at their ends adjacent the outer wall of the casing so as to form within the fork vertical channels of substantially triangular cross-section and to form with the rest of the radial portions and the inner and outer walls of the outer casing the compartments into chambers approximately ring-like in horizontal cross-section; the forked walls of each of the channels having an opening at the top of one of the walls forming a communication between the top of the channel and the top of one of the compartments and having an opening at the bottom of the other wall intercommunicating the bottom of the channel and the bottom of the adjacent compartment for circulation of gas from each compartment to the next into and out of each compartment at the outer wall of the annular casing where the compartments are widest.

2. Gas and liquid contact apparatus comprising: a substantially annular series of gas treating compartments with gas-tight radial partition walls between the compartments; vertical channels communicably connecting each compartment at its top with a next adjacent compartment at its bottom for circulation of gas in series through the compartments upwardly through the respective compartments; wherein overflow openings are provided in the radial partition walls near the bottoms of the compartments for overflow of liquid from the bottom of each compartment to the bottom of the next, and wherein an overflow pot is provided in each compartment bottom for receiving the liquid from the overflow opening thereto and maintaining it separate from liquid accumulating on the compartment bottom after down flow through the compartment, a liquid outlet for each overflow pot, means for feeding the liquid from the outlets of the respective overflow pots into the tops of the respective compartments the pots are in, the overflow openings to the respective pots being arranged at a distance from the outlets for the pots.

ADOLF SCHMALENBACH.